(12) United States Patent
Dagys et al.

(10) Patent No.: US 11,929,926 B2
(45) Date of Patent: *Mar. 12, 2024

(54) TRAFFIC SERVICE THREADS FOR LARGE POOLS OF NETWORK ADDRESSES

(71) Applicant: oxylabs, UAB, Vilnius (LT)

(72) Inventors: Gediminas Dagys, Neringa (LT);
Paulius Vitkus, Vilnius (LT)

(73) Assignee: Oxylabs, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,815

(22) Filed: Sep. 13, 2022

(65) Prior Publication Data

US 2023/0188464 A1    Jun. 15, 2023

Related U.S. Application Data

(63) Continuation of application No. 17/644,249, filed on Dec. 14, 2021, now Pat. No. 11,489,770.

(51) Int. Cl.
| | |
|---|---|
| *H04L 45/74* | (2022.01) |
| *H04L 65/1045* | (2022.01) |
| *H04L 65/1069* | (2022.01) |
| *H04L 67/02* | (2022.01) |
| *H04L 67/562* | (2022.01) |

(52) U.S. Cl.
CPC .......... *H04L 45/74* (2013.01); *H04L 65/1045* (2022.05); *H04L 65/1069* (2013.01); *H04L 67/02* (2013.01); *H04L 67/562* (2022.05)

(58) Field of Classification Search
CPC ... H04L 67/02; H04L 65/1045; H04L 67/562; H04L 65/1069; H04L 45/74
See application file for complete search history.

(56) References Cited

U.S. PATENT DOCUMENTS

| | | |
|---|---|---|
| 11,489,770 B1 * | 11/2022 | Dagys ............. H04L 45/74 |
| 2002/0133586 A1 | 9/2002 | Shanklin |
| 2005/0234936 A1 | 10/2005 | Castro |
| 2006/0041733 A1 | 2/2006 | Hyser |
| 2009/0234953 A1 | 9/2009 | Braslavsky |
| 2015/0312116 A1 | 10/2015 | Taheri |
| 2015/0378762 A1 | 12/2015 | Saladi |
| 2016/0182379 A1 | 6/2016 | Mehra |
| 2017/0093669 A1 | 3/2017 | Nortman |

* cited by examiner

*Primary Examiner* — Mohammad S Anwar
*Assistant Examiner* — Kenneth P Hunt
(74) *Attorney, Agent, or Firm* — Norton Rose Fulbright US LLP

(57) ABSTRACT

Traffic services for network addresses may be provided within threads executing within a main process for managing the traffic services. The threads may share resources within the main process, reducing the computing resources consumed to provide traffic services to large pools of network addresses. According to one embodiment, a method may include executing a main process for managing traffic services; determining, by the main process, a configuration specifying at least one or more destination addresses; instantiating, by the main process, one or more traffic service (TS) threads for the one or more destination addresses; and/or processing, by the one or more traffic service (TS) threads, inbound traffic for the corresponding one or more destination addresses. Other aspects and embodiments for traffic management are also disclosed.

23 Claims, 6 Drawing Sheets

TRAFFIC SERVICE THREADS FOR LARGE POOLS OF NETWORK ADDRESSES

CROSS-REFERENCE TO RELATED PATENT APPLICATIONS

This application is a continuation of U.S. patent application Ser. No. 17/644,249 to Dagys et al., entitled "Traffic Service Threads for Large Pools of Network Addresses, and filed on Dec. 14, 2021, which is hereby incorporated by reference.

FIELD OF THE DISCLOSURE

The instant disclosure relates to network traffic management. More specifically, portions of this disclosure relate to efficiently processing traffic services for a large pool of target network services.

BACKGROUND

Proxy servers are intermediate servers that accept requests from clients and forward the requests to other proxy servers, a source server, or service the request from their own cache. Proxy servers may execute on personal computers, mobile devices, or datacenter servers. Conventionally, a proxy server receives its own network address separate from a user, which has a source network address, and a target, which has a destination network address. Although proxy servers may provide useful functions to a user, proxy servers use computing resources that could otherwise be used for other computing services. For example, computing resources could alternatively be used by a web server for fulfilling the user request.

SUMMARY

The resources consumed by a proxy server may increase quickly as additional proxy servers are used. For example, many proxy servers operating concurrently on a computing system can quickly consume available computing resources. Embodiments of this disclosure may provide efficient execution of proxy servers and other traffic services to allow operation of large numbers, such as tens, hundreds, or thousands of traffic services concurrently on a computing system. This allows a network operator to provide traffic services for large pools of network addresses owned, controlled, or serviced by the network operator. Additionally, embodiments of this disclosure may provide efficient reconfiguration of traffic services to facilitate management of large pools of network addresses owned, controlled, or serviced by the network operator.

Traffic services for network addresses may be provided by threads executing within a main process for managing the traffic services. The threads may share resources within the main process, reducing the computing resources consumed to provide traffic services to large pools of network addresses. This may allow a computing system to host more proxy servers without increasing the available resources on the computing system. Although the benefits may be obtained when managing large pools of network addresses, the same benefits may be obtained when managing two or a few network addresses.

According to one embodiment, a method may include executing a main process for managing traffic services; determining, by the main process, a configuration specifying at least one or more destination addresses; instantiating, by the main process, one or more traffic service (TS) threads for the one or more destination addresses; and/or processing, by the one or more traffic service (TS) threads, inbound traffic for the corresponding one or more destination addresses. This method and other methods in this disclosure may be embedded in a computer-readable medium as computer program code comprising instructions that cause a processor to perform operations corresponding to the steps of the method. In some embodiments, the processor may be part of a computing system including a first network adaptor configured to transmit data over a first network connection; and a processor coupled to the first network adaptor, and the memory, wherein the processor is configured to execute computer program code to perform the steps of methods described in this disclosure.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

These example embodiments describe and illustrate various operations for a server or other computing system. Certain example embodiments include traffic services for the processing of inbound network traffic. The processing may include forwarding of packets or other units of network traffic, such as frames. The processing may include modifying the packets, such as by replacing portions of a header of the packet, frame, or other unit of network traffic. The processing may include repackaging data by stripping a header from the data and forming a new packet or other unit of network traffic with a new header accompanying the same data. The processing may be performed in parallel for tens, hundreds, or thousands of destinations addresses efficiently to increase the number of traffic services that can be hosted with available computing resources. The efficient parallel processing may be performed, according to some embodiments of the disclosure, through light-weight threads that are instantiated by a main process.

Figure 1:
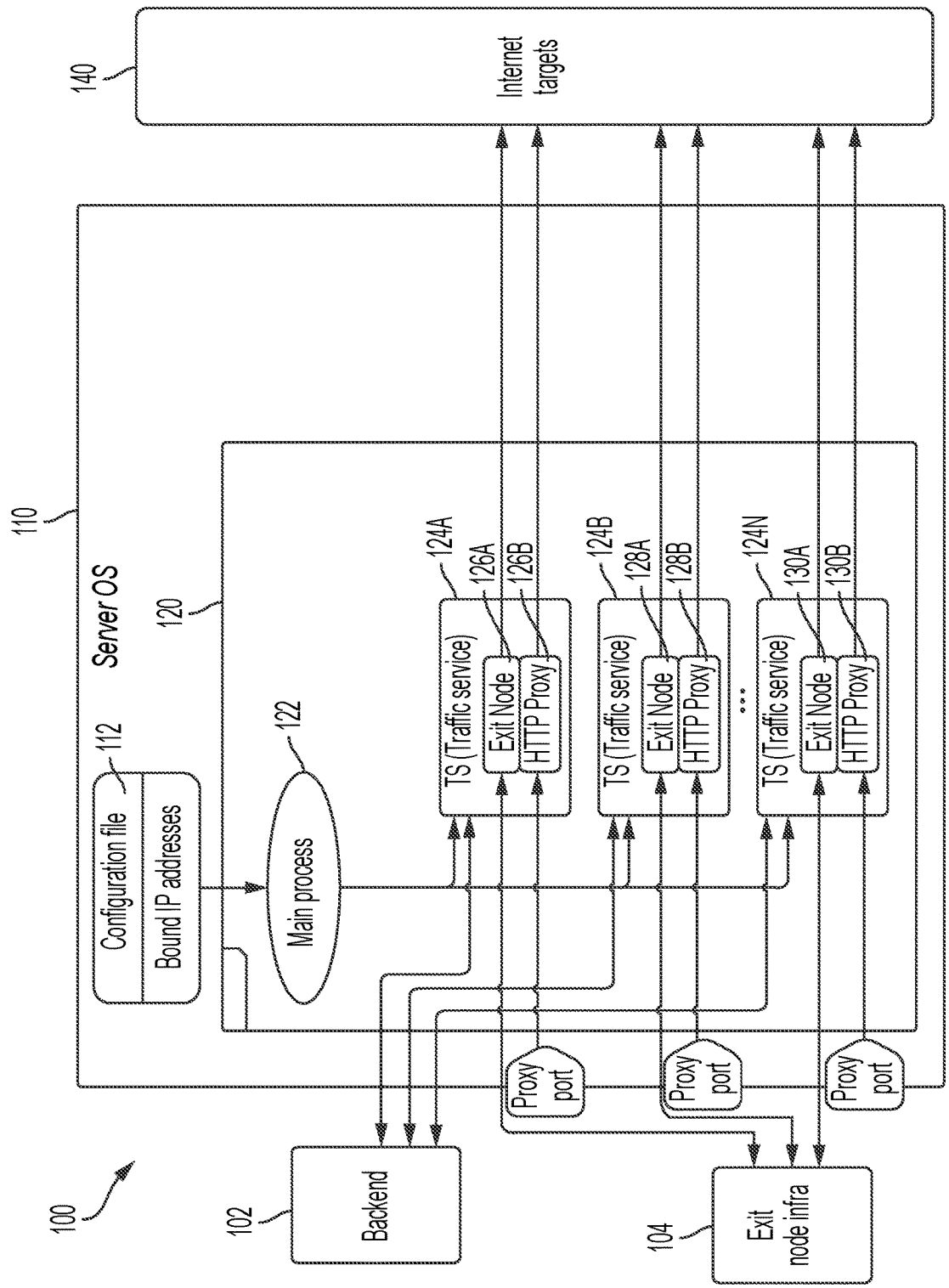
FIG. 1 is a block diagram illustrating operation of a network server according to some embodiments of the disclosure.

FIG. 1 is a block diagram illustrating operation of a network server according to some embodiments of the disclosure. A system 100 may include a server 110 that may execute a server application 120 on one or more processors of the server 110. For example, an operating system (O/S) may execute on the one or more processes, which may load computer-readable program code from a memory coupled to the processor to perform computing functions such as functions for operating on a network and facilitating receiving the receipt of and processing of network traffic received through a network interface. The server application 120 may execute as a main process 122 responsible for managing one or more traffic services (TS s). The server application 120 may access a configuration file 112 stored in memory of the server 110 to retrieve a configuration specifying one or more traffic services 124A, 124B, . . . 124N.

Each of the traffic services 124A-N may execute as a separate thread from the main process 122 for handling traffic associated with an assigned one or more destination addresses. The traffic services 124A-N may be separately configured to handle certain traffic types for the assigned one or more destination addresses. For example, the traffic service 124A may include an exit node 126A and an HTTP proxy 126B. The HTTP proxy 126B may have an assigned proxy port at which HTTP proxy traffic is received for the one or more destination addresses. The HTTP proxy 126B then forwards requests to one or more Internet targets 140. Additional traffic services 124B-N may execute as separate threads from the traffic service 124A and separate from the main process 122.

An HTTP proxy, such as proxies 126B, 128B, and 130B, may forward web requests to a target destination 140 on behalf of a user in response to a user request. HTTP proxies 126B, 128B, and 130B may be configured to perform one or more additional functions, such as for improving data security and/or network performance. For example, proxy servers can act as a firewall, act as a web filter, provide shared network connections, and/or cache data to speed up common requests. Proxies can also provide increased privacy. For example, the proxies can change the source address and/or other identifying information in a user's request such that the target destination 140 does not know about the user who made the original request. Removing the user's information may also permit the user to access content otherwise not accessible to the user. For example, a proxy may be used to avoid geographic-based content restrictions. If a user requests content from a United States (US) webpage but the user does not have access from their home country, the user can make the request through a proxy that is located in the US. When the request is transmitted through a US-based proxy, the user's request appears to be originating in the US. Proxy servers can further be used to monitor and/or control Internet usage, such as of employees and children, or improve browsing speeds and reduce bandwidth consumption by caching popular websites and, when a request is made, sending the cached copy to the user.

An exit node, such as exit nodes 126A, 128A, and 130A, may be gateways wherein encrypted traffic is transmitted to a network, such as the Internet, or are proxies, and through these proxies the request from the user (or the entry node) reaches the Internet. There can be several proxies used to perform a user's request, but the exit node is the final proxy that contacts the target and forwards the information from the target to the queue to reach the user. There can be several proxies serving the user's request, forming a proxy chain, passing the request through each proxy in the linear sequence, with the exit node being the last link in the chain that ultimately passes the request to the target destination 140. For example, a user may transmit data through several proxy nodes in a chain of proxy nodes, eventually arriving at one of exit nodes 126A, 128A, or 130A.

The exit nodes 126A, 128A, and 130A may be managed by exit node infrastructure 104, which monitors the availability of exit nodes 126A, 128A, and 130A, manages network traffic through the various exit nodes 126A, 128A, and 130A, as well as perform other management and accounting functions. The exit node infrastructure 104 may maintain an exit node database, which may be a data structure e.g., a database, or a file, that contains information about exit nodes, including exit node configuration attributes. The exit node infrastructure 104 may also or alternatively maintain exit node metadata, such as information about the exit node, including the exit node configuration settings.

The exit nodes 126A, 128A, and 130A may also facilitate the transmission of a reply back to the user from the target destination 140 through the original chain of proxies or another chain of proxies to the front-end (FE) proxy that originated the user request. The FE proxy may be a proxy providing client-facing interface to the proxy services for a client or a group of clients. The FE proxy is used to receive the requests from a client, or multiple clients, and to pass the request to the infrastructure that executes the function of transmitting the user's request to the target destination 140 through an exit node, or multiple exit nodes selected for the task, such as one of exit nodes 126A, 128A, or 130A. The FE proxy may provide data caching services and serve the client with the data stored in a local cache in case the cached data is precisely the data requested by the user.

The threads for handling traffic services 124A-N may execute in the context of the main process 122, sharing a memory space and system resources with the main process 122. The main process 122 may have a virtual address space, executable code, open handles to system objects, a security context, a unique process identifier, environment variables, a priority class, minimum and maximum working set sizes, and/or at least one thread of execution. The main process 122 may execute a main thread, which may be a primary thread, that creates additional threads for each of the traffic services 124A-N. Each of the additional threads may maintain exception handlers, a scheduling priority, thread local storage, a unique thread identifier, and/or a set of structures the system will use to save the thread context until it is scheduled. The thread context may include the thread's set of machine registers, the kernel stack, a thread environment block, and/or a user stack in the address space of the thread's process. The traffic services 124A-N operate in the same process as the main process 112, within the same shared memory space. Threads for the traffic services 124A-N may share with each other their code section, data section, and OS resources (such as open files and signals), but each thread may have its own program counter (PC), register set, and stack space.

Each of the additional threads corresponding to traffic services 124A-N may be created by specifying to the operating system a function name or other address location of code for the thread to execute, which may be a common traffic service function shared by all the traffic services 124A-N. When creating an additional thread, the main process 122 may provide configuration information to the additional thread specifying one or more destination addresses and one or more network services to provide for the one or more destination addresses. In some embodiments, the additional thread may create further additional threads for executing the individual network services provided by the traffic services 124A-N. For example, the main process 122 may create an additional thread corresponding to the traffic service 124A, and the traffic service 124A may create an additional thread corresponding to the HTTP proxy 126B. The configuration information provided to the additional thread for the traffic services 124A-N may be a subset of the configuration file 112 for server application 120.

The operating system of the server 110 may schedule execution of the threads corresponding to the main process 122 and traffic services 124A-N using, for example, a system scheduler. In some embodiments, preemptive multitasking may be used to create the effect of simultaneous execution of multiple threads corresponding to traffic services 124A-N. In some embodiments, multiple processors may be available to the server 110, and each processor assigned execution of a different one of the threads corresponding to traffic services 124A-N. In some embodiments, the processors may be virtual processors executing as virtual machines (VMs).

Each of traffic services 124A-N may provide different network services corresponding to different destinations addresses. Example network services may include, but are not limited to, an exit node, a HTTP proxy, an FTP proxy, a HTTPS proxy, a Telnet proxy, a SSH proxy, a SFTP proxy, a DNS proxy, a SMTP proxy, a POP3 proxy, a IMAP proxy, a PPTP proxy, and/or a Torrent proxy. Each proxy may be assigned one or more proxy ports, which designate the ports for the assigned destination addresses that each of the traffic services 124A-N respond to. For example, the HTTP proxy 126B of traffic service 124A may be configured with a proxy port 8080, such that HTTP communications received at port 8080 are processed by the HTTP proxy 126A in a thread corresponding to the traffic service 124A. That thread may process network traffic received at the proxy port and forward or otherwise transmit a request to one or more Internet targets 140. Each of the traffic services 124A-N may be configured with different network services or the same network services.

The server application 120, or the separate threads corresponding to the main process 122 and/or the traffic services 124A-N, may communicate with other software or hardware services. A backend 102 may communicate with each of the traffic services 124A-N to provide information regarding the various destination addresses. For example, the backend 102 may collect statistics as accounting data, such as uptime number of bytes processed, and/or current bandwidth consumption by each of the traffic services 124A-N. The backend 102 may also provide a user interface, such as through a web page, to provide information to a user, such as an owner of the destination addresses. The user interface for the backend 102 may allow a user to monitor revenue generation by processing of network traffic through the traffic services 124A-N. An exit node infra 104 may coordinate operation of individual exit nodes 126A, 128A, and/or 130A.

The configuration of the system 100 may improve the efficiency of providing traffic services for a large number of destination addresses. For example, by executing the traffic services 124A-N as separate threads from the main process 122, the memory used to support traffic services for destination addresses is reduced. With traffic services 124A-N assigned to corresponding N destination addresses, the handing of the N destination addresses by N light-weight threads instead of by N separate processes can decrease memory usage in the system 100 by up to 500-1000%.

The memory reduction may be achieved by the sharing of certain system resources between the traffic services 124A-N, such as by executing all of the traffic service 124A-N threads in shared memory space with the main process 122, while still each traffic service 124A-N may have a separate register stack used to support processing different network traffic from shared code. Additionally, the traffic services 124A-N may share garbage collectors and other overhead related to the execution of processes and/or applications and use less file descriptors, each of which provides increased efficiency over executing the traffic services 124A-N as separate independent processes. Further, the traffic services 124A-N may share program code and libraries that reduce overhead and improve efficiency. For example, the traffic services 124A-N may share a HTTP proxy library such that one copy of the library is loaded and used for traffic services 124A-N, rather than multiple copies of the HTTP proxy library.

A configuration according to embodiments described herein may provide more efficient utilization of system resources and allow a more efficient monetization of unallocated or idle network resources. For example, a user may own tens, hundreds, or thousands of internet protocol (IP) addresses that the user desires to monetize by handling network traffic for the destination addresses through network resources available to the user of the system 100. In one conventional system, the IP addresses are assigned to individual servers, but this is cumbersome and inefficient in that processing network traffic for a single destination IP address does not result in full utilization of the system resources. In another conventional system, the IP addresses are assigned to individual processes executing on a server or executing across multiple servers, but this is inefficient in that the separate memory spaces of the separate processes have separate overhead that fills the system memory. This may result in the system memory being filled by the separate processes while still leaving other system resources underutilized. For example, a large number of destination IP addresses with little traffic can result in the memory filling up with the overhead of the separate processes but the network interface and/or the processor remaining underutilized because the network traffic for each of the separate processes is small.

Shortcomings mentioned here are only representative and are included to highlight problems that the inventors have identified with respect to existing computing systems and sought to improve upon. Aspects of the computing systems described herein may address some or all of the shortcomings as well as others known in the art. Aspects of the improved computing systems described herein may present other benefits than, and be used in other applications than, those described above.

Additional details regarding the operation of a system 100 are described in FIG. 2, FIG. 3, FIG. 4, and FIG. 5. One or more blocks (or operations) described with reference to FIGS. 2, 3, and/or 5 may be combined with one or more blocks (or operations) described with reference to another of the figures. For example, one or more blocks (or operations) of FIG. 2 may be combined with one or more blocks (or operations) of FIG. 3. As another example, one or more blocks associated with FIG. 2 may be combined with one or more blocks associated with FIG. 5. As another example, one or more blocks associated with FIGS. 2-3 and/or 5 may be combined with one or more blocks (or operations) associated with FIGS. 1 and/or 6. Additionally, or alternatively, one or more operations described above with reference to FIG. 1 may be combined with one or more operations described with reference to FIG. 6.

Figure 2:
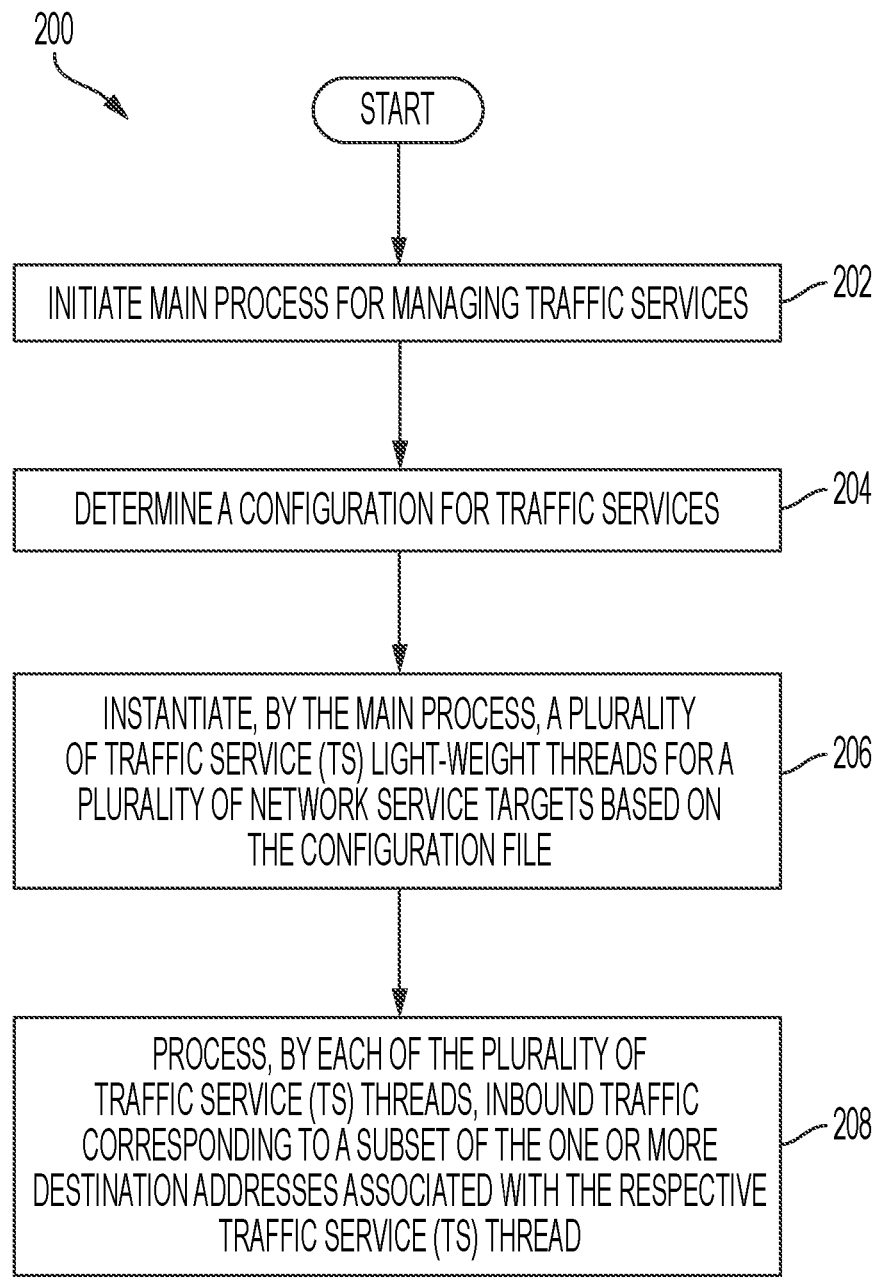
FIG. 2 is a flow chart illustrating a method of processing network traffic according to one or more embodiments of the disclosure.

FIG. 2 is a flow chart illustrating a method of processing network traffic according to one or more embodiments of the disclosure. A method 200 may include initiating a main process at block 202 on a network server. For example, referring to FIG. 1, the server application 120 may initiate main process 122. The parent process, at block 204, may determine a configuration, such as by reading a configuration file for the network server. For example, referring to FIG. 1, the main process 122 of the server application 120 may read configuration file 112. At block 206, the main process may instantiate a plurality of traffic service light-weight threads for a plurality of network service targets based on the configuration. For example, referring to FIG. 1, the main process 122 may instantiate threads for traffic services 124A-N with corresponding destination IP addresses, and configure each of the traffic services 124A-N with certain network services, such as exit nodes and/or HTTP proxies. At block 208, the plurality of traffic services may process inbound traffic for a corresponding to one or more destination addresses associated with the respective traffic service thread. For example, referring to FIG. 1, the traffic services 124A-N may process inbound traffic for one or more destination IP addresses, in which the processing may include forwarding network traffic to one or more Internet targets 140.

Figure 3:
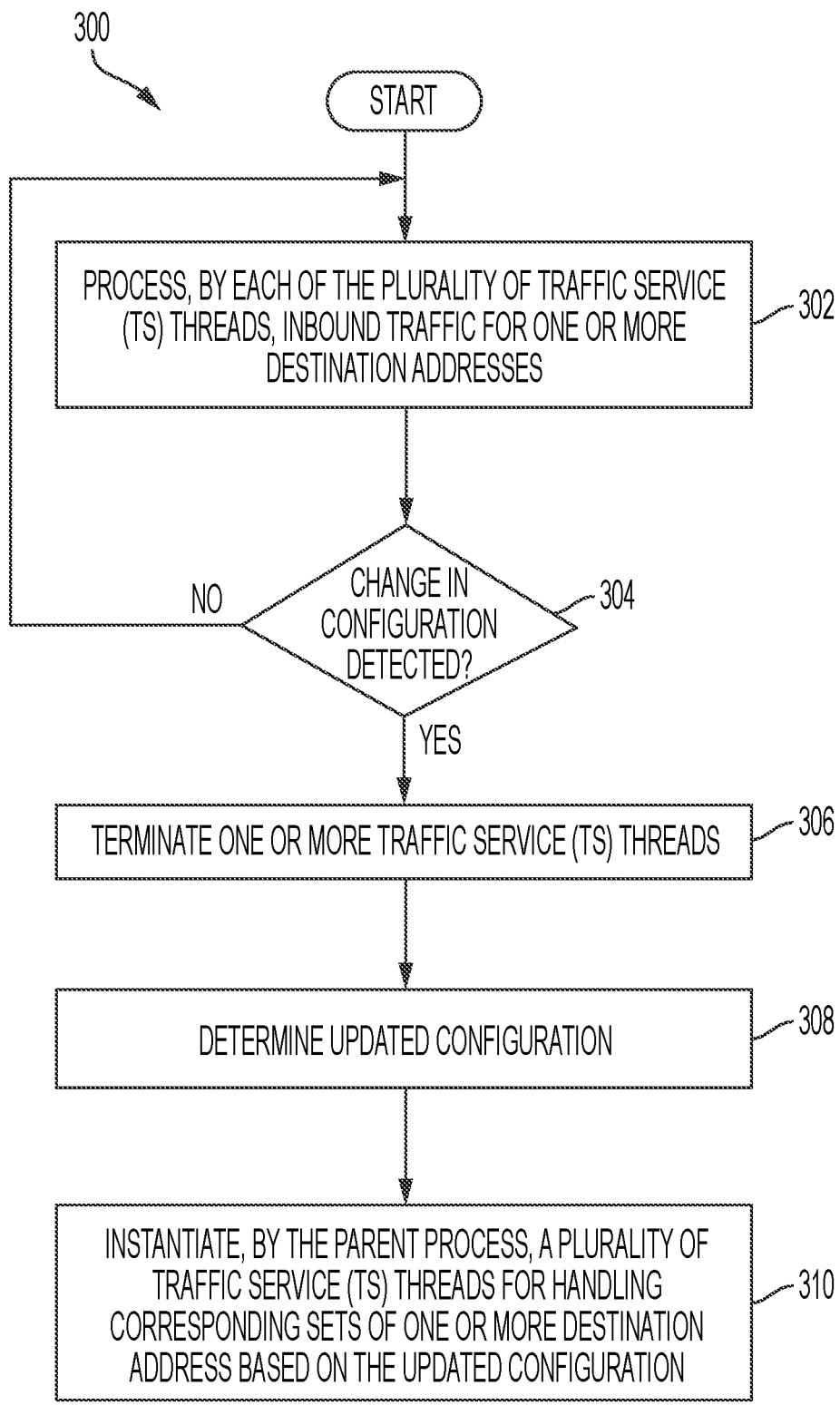
FIG. 3 is a flow chart illustrating a method for reconfiguring traffic services according to some embodiments of the disclosure.

The traffic services configuration of the server application 120 may be reconfigured. For example, reconfiguration may occur after detecting changes to the configuration file. As another example, reconfiguration may occur when a periodic check of the configuration indicates a change in configuration. Reconfiguration of the server application 120 is described with reference to FIG. 3. FIG. 3 is a flow chart illustrating a method for reconfiguring traffic services according to some embodiments of the disclosure. A method 300 includes, at block 302, processing inbound network traffic through a plurality of traffic service (TS) threads. At block 304, the system determines if a change in configuration has occurred. For example, referring to FIG. 1, the server application 120 may detect a read/write operation to the configuration file 112 indicating a change to the contents of the configuration file 112. If no change in configuration is detected, the method 300 continues processing inbound traffic at block 302. If a change in configuration is detected, the method 300 continues to block 306 to terminate one or more traffic service threads that are no longer part of the configuration. At block 308, the updated configuration is determined, such as by reading the configuration file and parsing to determine a configuration for traffic services within the server application. At block 310, the parent process instantiates a plurality of traffic service light-weight threads corresponding to one or more destination addresses based on the updated configuration.

Figure 4:
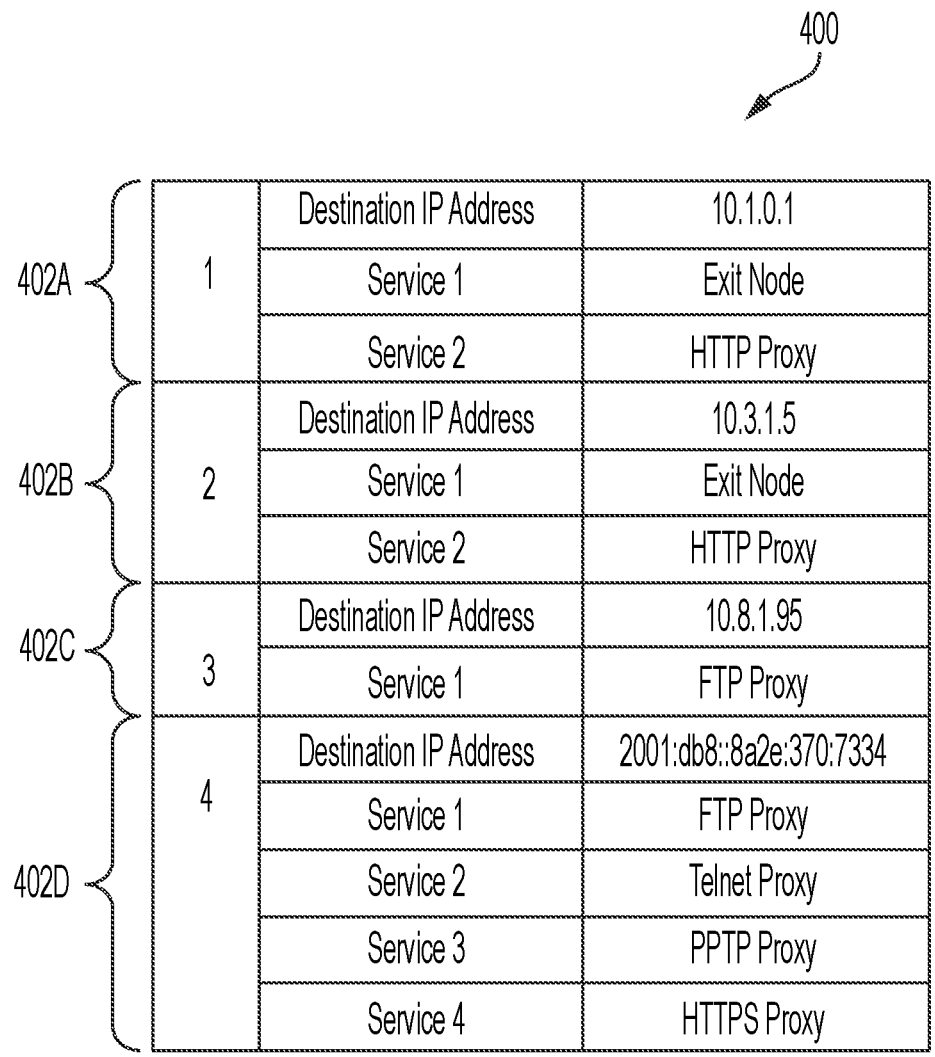
FIG. 4 is a block diagram illustrating a traffic service configuration according to some embodiments of the disclosure.

An example configuration with described traffic services is shown in FIG. 4. FIG. 4 is a block diagram illustrating a traffic service configuration according to some embodiments of the disclosure. A configuration file 400 includes a portion 402A specifying a first traffic service, a portion 402B specifying a second traffic service, a portion 402C specifying a third traffic service, and a portion 402D specifying a fourth traffic service. Each of the portions 402A-D may include a field specifying one or more destination IP addresses for the traffic service and one or more network services to provide for that destination IP address. In the example of FIG. 4, portion 402A specifies an exit node and an HTTP proxy for destination IPv4 address 10.1.0.1 and portion 402D specifies an FTP proxy, a Telnet proxy, a PPTP proxy, and a HTTPS proxy for destination IPv6 address 2001:db8::8a2e:370:7334.

Figure 5:
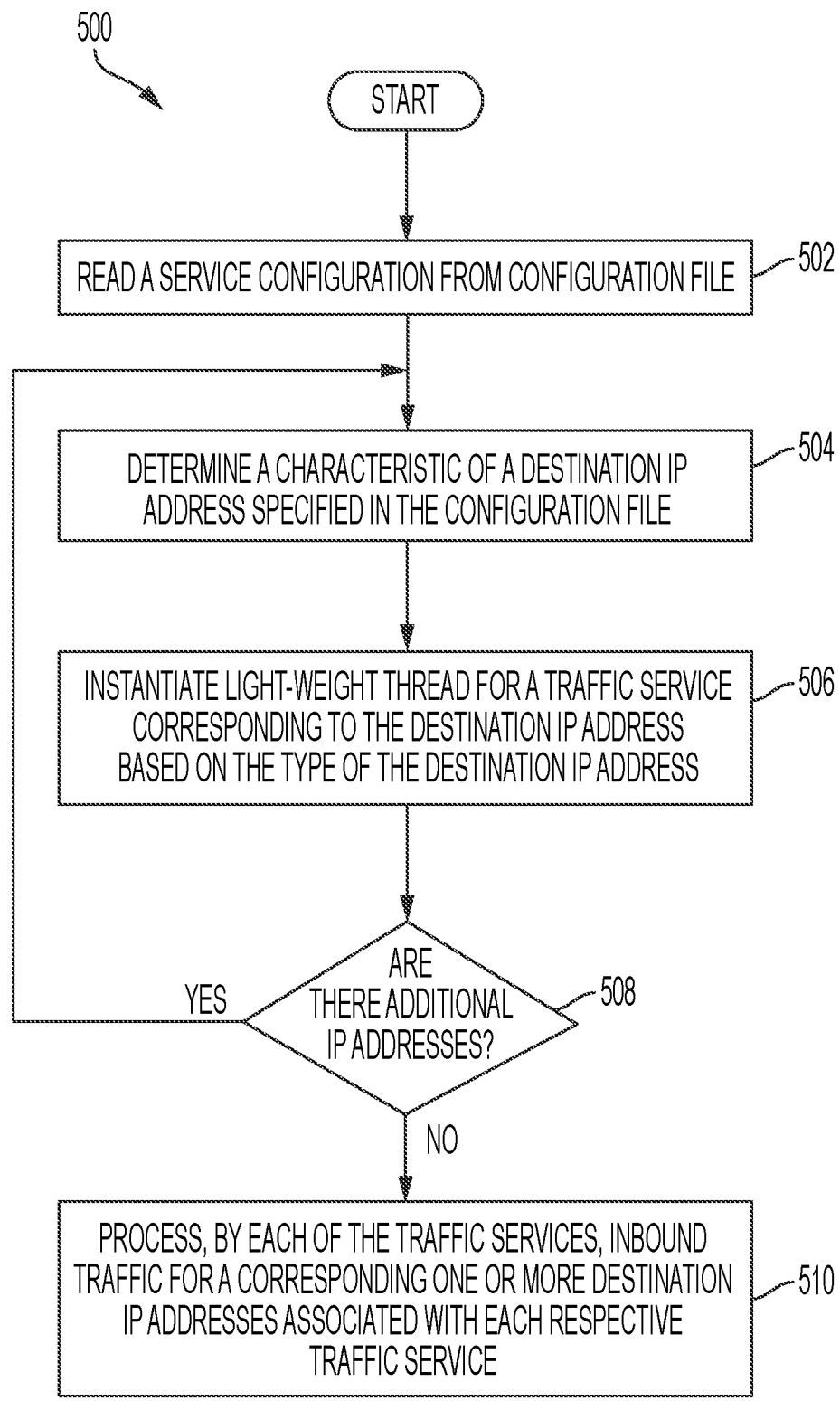
FIG. 5 is a flow chart illustrating a method for configuring traffic services based on destination characteristics according to some embodiments of the disclosure.

The configuration for a traffic service for its corresponding destination address may be determined based on characteristics of the destination address. For example, traffic services assigned to destination IP addresses determined to be residential IP addresses may have a first network service configuration, whereas traffic services assigned to destination IP addresses determined to be commercial IP addresses may have a different, second network service configuration. An example configuration of a server application with traffic services based on characteristics of the destination address is shown in FIG. 5. FIG. 5 is a flow chart illustrating a method for configuring traffic services based on destination characteristics according to some embodiments of the disclosure. A method 500 includes, at block 502, reading a service configuration from a configuration file. The configuration file may list destination IP addresses for handling network traffic but may not specify the particular network services associated with each destination IP address. For example, the configuration file may be similar to that shown in FIG. 4 but omit the services corresponding to the destination IP addresses.

At block 504, a characteristic of the destination IP address may be determined. Example characteristic of IP addresses may include, but are not limited to, residential/commercial, country, state, owner, Internet Service Provider (ISP). At block 506, a light-weight thread is instantiated for a traffic service corresponding to the destination IP address based on the characteristic of the destination IP address. Rules may specify certain network services for destination IP addresses with certain characteristics. The rules may specify network services based on one or more characteristics, such as residential/commercial and/or county of the destination IP address. The rules may be specified in the configuration file read at block 502 or the rules may be specified elsewhere. At block 508, the method 500 determines if additional destination IP addresses are listed in the configuration file for processing. If additional destination IP addresses exist, the additional IP addresses are read, characteristics determined, and light-weight threads instantiated for each additional destination IP address. When all destination IP addresses are processed, the method 500 continues to block 510 to process inbound traffic through the instantiated traffic services.

For purposes of this disclosure, a computing system, such as a server, may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a computing system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. Such a computing system may include random access memory (RAM), one or more processing resources such as a central processing unit (CPU) or hardware or software control logic, ROM, and/or other types of nonvolatile memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
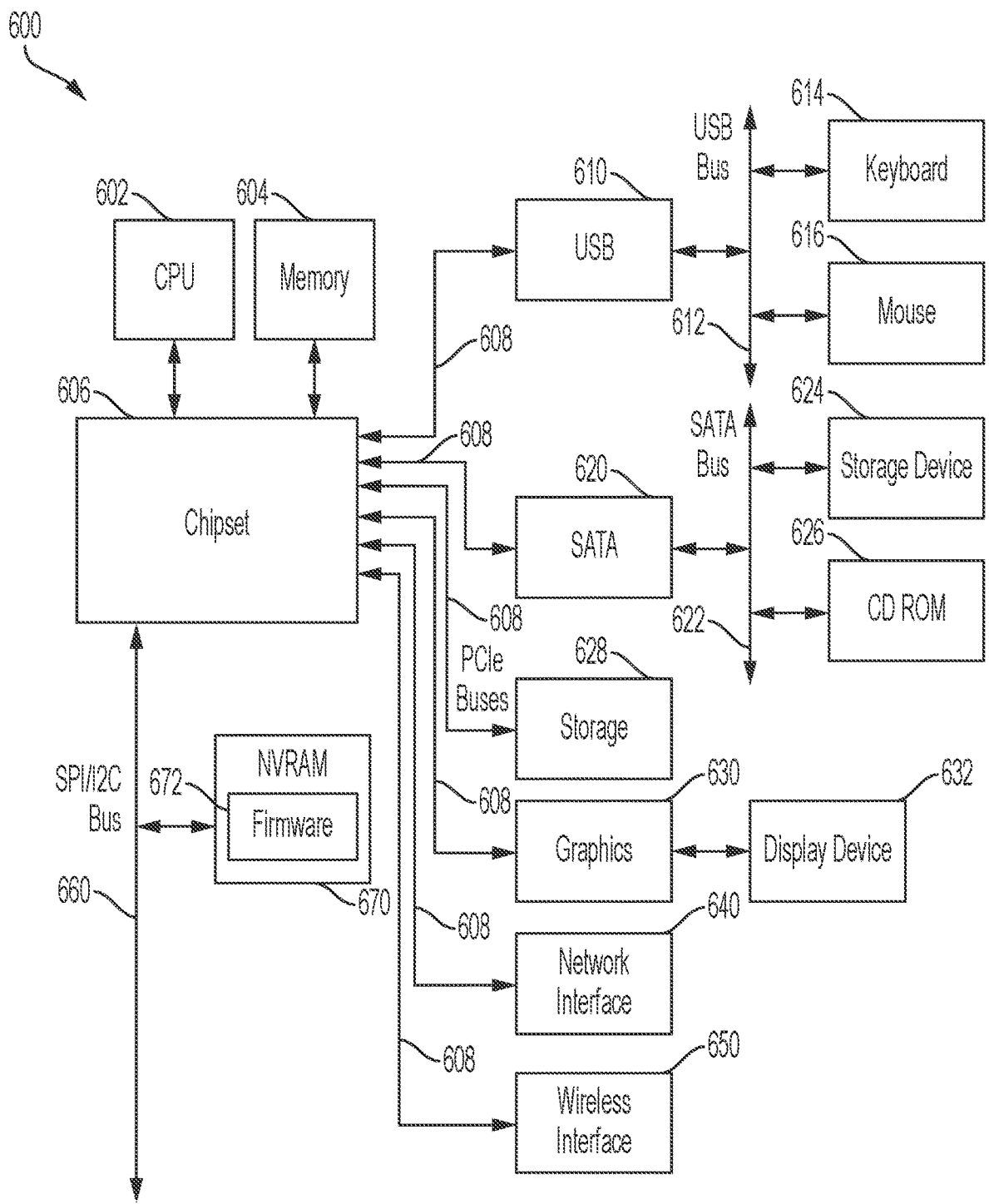
FIG. 6 is a block diagram illustrating a computing system according to some embodiments of the disclosure.

FIG. 6 illustrates an example computing system 600. Computing system 600 may include a processor 602 (e.g., a central processing unit (CPU)), a memory (e.g., a dynamic random-access memory (DRAM)) 604, and a chipset 606. In some embodiments, one or more of the processor 602, the memory 604, and the chipset 606 may be included on a motherboard (also referred to as a mainboard), which is a printed circuit board (PCB) with embedded conductors organized as transmission lines between the processor 602, the memory 604, the chipset 606, and/or other components of the computing system. In some embodiments, one or more of the processor 602, the memory 604, the chipset 606, and/or other components may be organized as a System on Chip (SoC).

The processor 602 may execute program code by accessing instructions loaded into memory 604 from a storage device, executing the instructions to operate on data also loaded into memory 604 from a storage device, and generate output data that is stored back into memory 604 or sent to another component. The processor 602 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 602 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 606 may facilitate the transfer of data between the processor 602, the memory 604, and other components. In some embodiments, chipset 606 may include two or more integrated circuits (ICs), such as a northbridge controller coupled to the processor 602, the memory 604, and a southbridge controller, with the southbridge controller coupled to the other components such as USB 610, SATA 620, and PCIe buses 608. The chipset 606 may couple to other components through one or more PCIe buses 608.

Some components may be coupled to one bus line of the PCIe buses 608, whereas some components may be coupled to more than one bus line of the PCIe buses 608. One example component is a universal serial bus (USB) controller 610, which interfaces the chipset 606 to a USB bus 612. A USB bus 612 may couple input/output components such as a keyboard 614 and a mouse 616, but also other components such as USB flash drives, or another computing system. Another example component is a SATA bus controller 620, which couples the chipset 606 to a SATA bus 622. The SATA bus 622 may facilitate efficient transfer of data between the chipset 606 and components coupled to the chipset 606 and a storage device 624 (e.g., a hard disk drive (HDD) or solid-state disk drive (SDD)) and/or a compact disc read-only memory (CD-ROM) 626. The PCIe bus 608 may also couple the chipset 606 directly to a storage device 628 (e.g., a solid-state disk drive (SDD)). A further example of an example component is a graphics device 630 (e.g., a graphics processing unit (GPU)) for generating output to a display device 632, a network interface controller (NIC) 640, and/or a wireless interface 650 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example embodiment, chipset 606 may be directly connected to an individual end point via a PCIe root port within the chipset and a point-to-point topology as shown in FIG. 6.

The chipset 606 may also be coupled to a serial peripheral interface (SPI) and/or Inter-Integrated Circuit (I2C) bus 660, which couples the chipset 606 to system management components. For example, a non-volatile random-access memory (NVRAM) 670 for storing firmware 672 may be coupled to the bus 660. Firmware 672 may include instructions executable by processor 602 to initialize and test the hardware components of system 600. For example, the instructions may cause the processor 602 to execute a power-on self-test (POST). The instructions may further cause the processor 602 to load a boot loader or an operating system (OS) from a mass storage device. Firmware 672 additionally may provide an abstraction layer for the hardware, such as a consistent way for application programs and operating systems to interact with the keyboard, display, and other input/output devices.

When power is first applied to computing system 600, the system may begin a sequence of initialization procedures, such as a boot procedure or a secure boot procedure. During the initialization sequence, also referred to as a boot sequence, components of system 600 may be configured and enabled for operation and device drivers may be installed. Device drivers may provide an interface through which other components of the system 600 can communicate with a corresponding device. The firmware 672 may include a basic input-output system (BIOS) and/or include a unified extensible firmware interface (UEFI). Firmware 672 may also include one or more firmware modules of the computing system. Additionally, configuration settings for the firmware 672 and firmware of the computing system 600 may be stored in the NVRAM 670. NVRAM 670 may, for example, be a non-volatile firmware memory of the computing system 600 and may store a firmware memory map namespace of the computing system 600. NVRAM 670 may further store one or more container-specific firmware memory map namespaces for one or more containers concurrently executed by the computing system.

Computing system 600 may include additional components and additional busses, not shown for clarity. For example, system 600 may include multiple processor cores (either within processor 602 or separately coupled to the chipset 606 or through the PCIe buses 608), audio devices (such as may be coupled to the chipset 606 through one of the PCIe busses 608), or the like. While a particular arrangement of bus technologies and interconnections is illustrated for the purpose of example, one of skill will appreciate that the techniques disclosed herein are applicable to other system architectures. System 600 may include multiple processors and/or redundant bus controllers. In some embodiments, one or more components may be integrated together in an integrated circuit (IC), which is circuitry built on a common substrate. For example, portions of chipset 606 can be integrated within processor 602. Additional components of computing system 600 may include one or more storage devices that may store machine-executable code, one or more communications ports for communicating with external devices, and various input and output (I/O) devices, such as a keyboard, a mouse, and a video display.

In some embodiments, processor 602 may include multiple processors, such as multiple processing cores for parallel processing by the computing system 600. For example, the computing system 600 may include a server comprising multiple processors for parallel processing. In some embodiments, the computing system 600 may support virtual machine (VM) operation, with multiple virtualized instances of one or more operating systems executed in parallel by the computing system 600. For example, resources, such as processors or processing cores of the computing system may be assigned to multiple containerized instances of one or more operating systems of the computing system 600 executed in parallel. A container may, for example, be a virtual machine executed by the computing system 600 for execution of an instance of an operating system by the computing system 600. Thus, for example, multiple users may remotely connect to the computing system 600, such as in a cloud computing configuration, to utilize resources of the computing system 600, such as memory, processors, and other hardware, firmware, and software capabilities of the computing system 600. Parallel execution of multiple containers by the computing system 600 may allow the computing system 600 to execute tasks for multiple users in parallel secure virtual environments.

The schematic flow chart diagrams of FIG. 2, FIG. 3, and FIG. 5 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
executing a main process for managing traffic services;
determining, by the main process, a configuration specifying at least one or more destination addresses;
instantiating, by the main process, one or more traffic service (TS) threads for the one or more destination addresses;
determining one or more characteristics corresponding to the one or more destination addresses, wherein each of the one or more TS threads is configured with one or more network services corresponding to the one or more characteristics; and
processing, by the one or more traffic service (TS) threads, inbound traffic for a corresponding one or more destination addresses associated with each of a respective one or more traffic service (TS) threads.

2. The method of claim 1, wherein the one or more TS threads are executed within a shared virtual memory space with the main process.

3. The method of claim 1, wherein:
each of the one or more TS threads is assigned a subset of the one or more destination addresses; and
each of the one or more TS threads is configured with one or more network services corresponding to a respective subset of the one or more destination addresses.

4. The method of claim 3, wherein a configuration file specifies at least one or more network services associated with the at least one or more destination addresses, and wherein instantiating the one or more TS threads with corresponding network services is based on the configuration file.

5. The method of claim 3, wherein each of the one or more TS threads is configured with one or more network services corresponding to the one or more characteristics of the respective subset of the one or more destination addresses associated with each of the one or more TS threads.

6. The method of claim 5, wherein the one or more TS threads comprise:
a first set of TS threads configured with a first set of network services based on determining that a first subset of the one or more destination addresses associated with the first set of TS threads comprise residential addresses; and
a second set of TS threads configured with a second set of network services based on determining that a second subset of the one or more destination addresses associated with the second set of TS threads comprise commercial addresses.

7. The method of claim 1, wherein the one or more network services comprises at least an HTTP proxy.

8. The method of claim 1, further comprising providing, by the one or more TS threads, accounting data regarding a subset of the one or more destination addresses associated with each of the one or more TS threads.

9. The method of claim 8, further comprising generating a user interface displaying the accounting data comprising network traffic for a subset of the one or more TS threads.

10. The method of claim 1, wherein processing, by the one or more traffic service (TS) threads, inbound traffic comprises forwarding inbound traffic to a target address.

11. The method of claim 1, wherein the one or more network services further comprises an exit node.

12. An apparatus, comprising:
a memory storing processor-readable code; and
at least one processor coupled to the memory, the at least one processor configured to execute the processor-readable code to cause the at least one processor to perform operations including:
executing a main process for managing traffic services;
determining, by the main process, a configuration specifying at least one or more destination addresses;
instantiating, by the main process, one or more traffic service (TS) threads for the one or more destination addresses;
determining one or more characteristics corresponding to the one or more destination addresses, wherein each of the one or more TS threads is configured with one or more network services corresponding to the one or more characteristics; and
processing, by each of the one or more traffic service (TS) threads, inbound traffic for a corresponding one or more destination addresses associated with each of the respective one or more traffic service (TS) threads.

13. The apparatus of claim 12, wherein the one or more TS threads are executed within a shared virtual memory space with the main process.

14. The apparatus of claim 12, wherein:
each of the one or more TS threads is assigned a subset of the one or more destination addresses; and
each of the one or more TS threads is configured with one or more network services corresponding to a respective subset of the one or more destination addresses.

15. The apparatus of claim 14, wherein each of the one or more TS threads is configured with one or more network services corresponding to the one or more characteristics of the respective subset of the one or more destination addresses associated with each of the one or more TS threads.

16. The apparatus of claim 15, wherein the one or more TS threads comprise:
a first set of TS threads configured with a first set of network services based on determining that a first subset of the one or more destination addresses associated with the first set of TS threads comprise residential addresses; and
a second set of TS threads configured with a second set of network services based on determining that a second subset of the one or more destination addresses associated with the second set of TS threads comprise commercial addresses.

17. The apparatus of claim 12, wherein the one or more network services comprises at least an HTTP proxy.

18. A computer program product, comprising:
a non-transitory computer readable medium comprising code for performing steps comprising:
executing a main process for managing traffic services;
determining, by the main process, a configuration specifying at least one or more destination addresses;
instantiating, by the main process, one or more traffic service (TS) threads for the one or more destination addresses;
determining one or more characteristics corresponding to the one or more destination addresses, wherein each of the one or more TS threads is configured with one or more network services corresponding to the one or more characteristics; and
processing, by the one or more traffic service (TS) threads, inbound traffic for a corresponding one or more destination addresses associated with each of the respective one or more traffic service (TS) threads.

19. The computer program product of claim 18, wherein the one or more TS threads are executed within a shared virtual memory space with the main process.

20. The computer program product of claim 18, wherein:
   each of the one or more TS threads is assigned a subset of the one or more destination addresses; and
   each of the one or more TS threads is configured with one or more network services corresponding to a respective subset of the one or more destination addresses.

21. The computer program product of claim 20, wherein each of the one or more TS threads is configured with one or more network services corresponding to the one or more characteristics of a respective subset of the one or more destination addresses associated with each of the one or more TS threads.

22. The computer program product of claim 21, wherein the one or more TS threads comprise:
   a first set of TS threads configured with a first set of network services based on determining that a first subset of the one or more destination addresses associated with the first set of TS threads comprise residential addresses; and
   a second set of TS threads configured with a second set of network services based on determining that a second subset of the one or more destination addresses associated with the second set of TS threads comprise commercial addresses.

23. The computer program product of claim 18, wherein the one or more network services comprises at least an HTTP proxy.

* * * * *